United States Patent
Han (10) Patent No.: US 12,032,998 B2
(45) Date of Patent: Jul. 9, 2024

(54) RESOURCE SYNCHRONIZATION METHOD, ELECTRONIC DEVICE AND STORAGE MEDIUM PRELIMINARY CLASS

(71) Applicant: BEIJING BAIDU NETCOM SCIENCE TECHNOLOGY CO., LTD., Beijing (CN)

(72) Inventor: Pengfei Han, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 5 days.

(21) Appl. No.: 18/157,523

(22) Filed: Jan. 20, 2023

(65) Prior Publication Data
US 2023/0259396 A1    Aug. 17, 2023

(30) Foreign Application Priority Data
Feb. 15, 2022    (CN) ............. 202210137703.3

(51) Int. Cl.
*G06F 9/50* (2006.01)

(52) U.S. Cl.
CPC ........ *G06F 9/5016* (2013.01); *G06F 9/5072* (2013.01)

(58) Field of Classification Search
CPC ................. G06F 9/5016; G06F 9/5072
See application file for complete search history.

(56) References Cited

U.S. PATENT DOCUMENTS

| | | | |
|---|---|---|---|
| 11,444,836 B1 * | 9/2022 | Mariappan | H04L 41/0843 |
| 2020/0034207 A1 * | 1/2020 | Selvaraj | G06F 9/5055 |
| 2021/0092188 A1 * | 3/2021 | Guo | H04L 67/34 |
| 2021/0303350 A1 * | 9/2021 | Hill | G06F 9/5011 |
| 2021/0344556 A1 * | 11/2021 | Zhao | H04L 41/082 |
| 2023/0300203 A1 * | 9/2023 | Zhu | H04L 67/141 |
| | | | 709/227 |

FOREIGN PATENT DOCUMENTS

| | | |
|---|---|---|
| CN | 111405055 A | 7/2020 |
| CN | 112925651 A | 6/2021 |
| CN | 112925652 A | 6/2021 |
| CN | 113849266 A | 12/2021 |
| EP | 3819757 A1 | 5/2021 |

OTHER PUBLICATIONS

Chinese Office Action issued in application No. 202210137703.03, on Apr. 19, 2023, 17 pages.
Chinese Search Report issued in application No. 202210137703.3, 5 pages on Apr. 10, 2023, 5 pages.
Chinese Supplemental Search Report issued in Application No. 2022101377033, on Jul. 25, 2023, 4 pages.
European Search Report issued in EP Application No. 23151085.0 on Mar. 9, 2023, 35 pages.

* cited by examiner

*Primary Examiner* — Sisley N Kim
(74) *Attorney, Agent, or Firm* — Hunton Andrews Kurth LLP (57) ABSTRACT

Provided are a resource synchronization method, an electronic device and a storage medium. The method includes: in response to listening to a resource change event, adding a target resource to a preset cache region; determining at least two target edge clusters from edge clusters establishing a connection with a cloud according to deployment information carried by the target resource; and pushing the target resource in the cache region to the at least two target edge clusters for deployment.

15 Claims, 4 Drawing Sheets

RESOURCE SYNCHRONIZATION METHOD, ELECTRONIC DEVICE AND STORAGE MEDIUM PRELIMINARY CLASS

CROSS-REFERENCE TO RELATED APPLICATION(S)

This application claims priority to Chinese Patent Application No. 202210137703.3 filed Feb. 15, 2022, the disclosure of which is incorporated herein by reference in its entirety.

TECHNICAL FIELD

The present disclosure relates to the technical field of computers and, in particular, to a cloud computing technology and an edge computing technology, specifically a resource synchronization method, an electronic device, and a storage medium.

BACKGROUND

With the development of the mobile Internet and the Internet of things, the number of devices that can access to the Internet and computing power of the devices have been improved exponentially. With the rise of edge computing, more than 70% of data in the future will be generated by an application of edge devices. At the same time, cloud computing is also developing rapidly. To unify application computing architectures of an edge and a cloud, the edge is gradually shifted from an original process application deployment to a container application deployment.

SUMMARY

The present disclosure provides a resource synchronization method, an electronic device, and a storage medium.

According to an aspect of the present disclosure, a resource synchronization method is provided. The resource synchronization method is applied to a cloud of an edge computing system and includes the following.

In response to listening to a resource change event, a target resource is added to a preset cache region.

At least two target edge clusters are determined from edge clusters establishing a connections with the cloud according to deployment information carried by the target resource.

The target resource in the cache region is pushed to the at least two target edge clusters for deployment.

According to an aspect of the present disclosure, a resource synchronization method is provided. The resource synchronization method is applied to an edge cluster and includes the following.

A communication connections between the edge cluster and a cloud of an edge computing system is established through a proxy service in the edge cluster.

A target resource pushed by the cloud is received and deployed based on the proxy service.

According to another aspect of the present disclosure, an electronic device is provided. The electronic device includes at least one processor and a memory communicatively connected to the at least one processor.

The memory stores instructions executable by the at least one processor to enable the at least one processor to perform the resource synchronization method according to any embodiment of the present disclosure.

According to another aspect of the present disclosure, a non-transitory computer-readable storage medium storing computer instructions is provided. The computer instructions are configured to cause a computer to perform the resource synchronization method according to any embodiment of the present disclosure.

According to the technique of the present disclosure, an effect of synchronizing a resource across edge clusters is achieved.

It is to be understood that the content described in this part is neither intended to identify key or important features of the embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solutions and not to limit the present disclosure.

DETAILED DESCRIPTION

Example embodiments of the present disclosure, including details of embodiments of the present disclosure, are described hereinafter in conjunction with drawings to facilitate understanding. The example embodiments are illustrative only. Therefore, it is to be appreciated by those of ordinary skill in the art that various changes and modifications may be made to the embodiments described herein without departing from the scope and spirit of the present disclosure. Similarly, description of well-known functions and constructions is omitted hereinafter for clarity and conciseness.

In the embodiments of the present disclosure, to unify application computing architectures of an edge and a cloud, the edge is gradually shifted from an original process application deployment to a container application deployment. On this basis, how to create a resource (such as a Deployment of an Nginx application) in the cloud and synchronize the resource to multiple edge clusters has become an urgent problem to be solved. Based on this, the present disclosure provides a resource synchronization method for an edge multi-cluster. For a specific flow, reference is made to the embodiments below.

Figure 1:
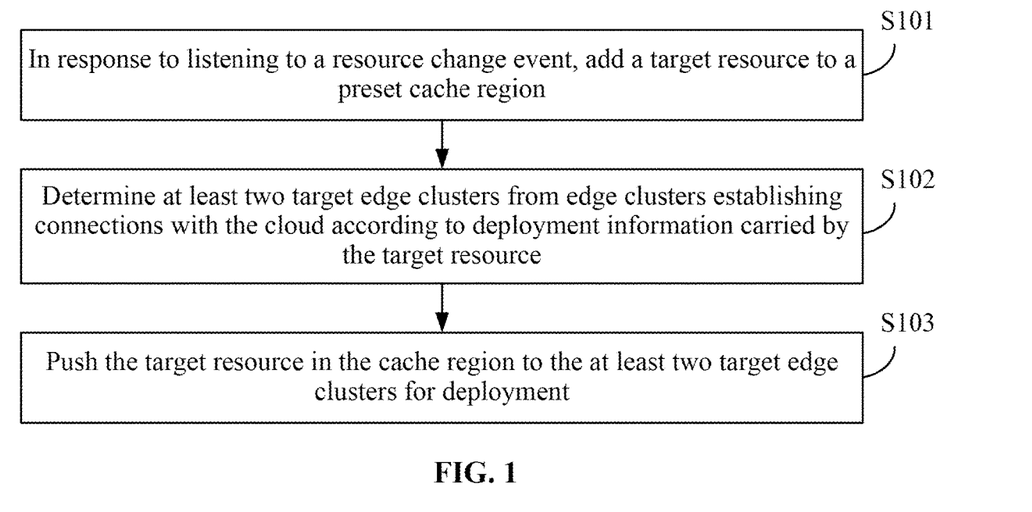
FIG. 1 is a flowchart of a resource synchronization method according to an embodiment of the present disclosure.

FIG. 1 is a flowchart of a resource synchronization method according to an embodiment of the present disclosure. The embodiment may be applicable to the case where a multi-edge device cluster is required to synchronize a resource through a cloud. The method may be performed by a resource synchronization apparatus. The apparatus is implemented by software and/or hardware and integrated in an electronic device, for example, integrated in a cloud cluster device of an edge computing system.

Specifically, referring to FIG. 1, the resource synchronization method includes the steps described below.

In S101, in response to listening to a resource change event, a target resource is added to a preset cache region.

In S102, at least two target edge clusters are determined from edge clusters establishing a connections with the cloud according to deployment information carried by the target resource.

In S103, the target resource in the cache region is pushed to the at least two target edge clusters for deployment.

In the embodiment of the present disclosure, the cloud cluster device of the edge computing system includes at least a controller, a preset cache region and a resource synchronization module. The controller is configured to listen to a k8s resource that a user expects to deploy, where the k8s resource is optionally an application resource that an edge device in the edge cluster is required to run. When the controller listens to a resource change event due to a resource change, for example, when the controller listens to an event that the user creates a new application resource, the controller uses the new application resource created by the user as the target resource and saves the target resource in the preset cache region. That is, the preset cache region is used as a buffer layer between the controller and the resource synchronization module for storing resources in the edge cluster that require to be resynchronized due to the resource change listened by the controller. It is to be noted that the controller of the cloud may use a watch/list mechanism of k8s to listen to the change of the user resource. The target resource is cached in the preset cache region, and the resource synchronization module subsequently acquires the target resource from the preset cache region and pushes the target resource so that the configuration of the preset cache region achieves decoupling of the controller and the resource synchronization module.

Further, using that the user creates an Nginx application which requires to be deployed in edge clusters A and B at the same time as an example to describe the step S101. A process of creating the Nginx application is as follows: in response to receiving a request to deploy a resource, a target resource corresponding to the request is created, where the target resource includes deployment information of the resource (information of an edge cluster to which the resource requires to be delivered). For example, after a native k8s deployment named Nginx is created in a cloud cluster, a user-defined resource is created and associated with a corresponding resource, and deployment information of the resource is specified, that is, the edge clusters A and B to which the resource requires to be delivered are specified. After the Nginx application is created, the controller caches the resource in the preset cache region.

In the embodiment of the present disclosure, the number of edge clusters is multiple, and each edge cluster is a set of devices including at least one edge device. The edge cluster is pre-registered in the cloud and establishes the communication connection with the cloud. Optionally, the connection is established using a preset communication protocol (such as the WebSocket protocol). In this manner, the edge cluster included in the deployment information of the target resource may be directly used as the target edge cluster.

Further, the resource synchronization module includes a push sub-module and a connection pool, where the connection pool is used for maintaining the connection between the cloud and the edge cluster. In this manner, after obtaining the target resource from the preset cache region, the push sub-module pushes the target resource to the at least two target edge clusters at the same time for the deployment according to information of a cluster connection relationship maintained in the connection pool, so as to synchronize the target resource. It is to be noted here that a common resource synchronization solution includes SuperEdge in which multiple edge devices are managed through a cloud to meet a requirement of the synchronization of a resource in the cloud to the multiple edge devices. In an implementation idea of the solution, the entire cloud and all connected devices are regarded as a large cluster, and the cloud is a master node of the cluster. Therefore, in this solution, the edge devices cannot directly constitute an edge cluster, that is, synchronizing a resource across edge clusters cannot be achieved.

In the embodiment of the present disclosure, the cloud deploys the controller to listen to the change of the resource and synchronize the changed resource to multiple edge clusters, achieving an effect of synchronizing a resource across edge clusters.

Figure 2:
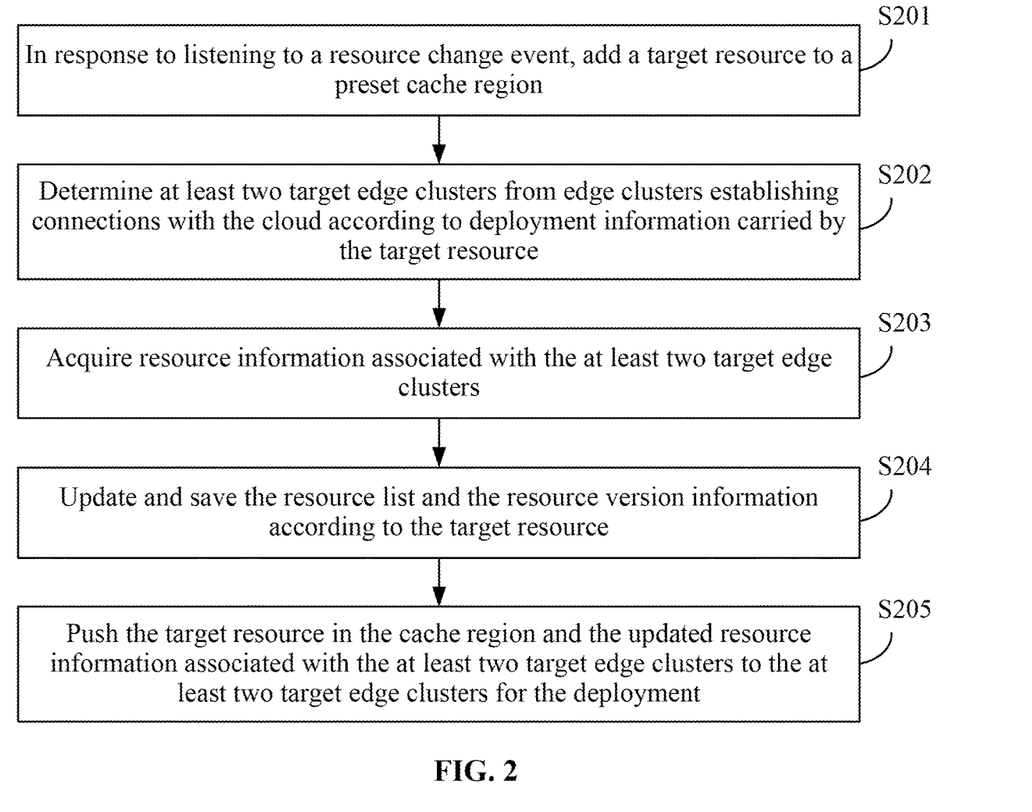
FIG. 2 is a flowchart of another resource synchronization method according to an embodiment of the present disclosure.

FIG. 2 is a flowchart of another resource synchronization method according to an embodiment of the present disclosure. This embodiment is an optimization on the basis of the preceding embodiment. Referring to FIG. 2, the resource synchronization method specifically includes the steps described below.

In S201, in response to listening to a resource change event, a target resource is added to a preset cache region.

In S202, at least two target edge clusters are determined from edge clusters establishing a connections with the cloud according to deployment information carried by the target resource.

In an optional embodiment, the deployment information is determined according to field information of a cluster name included in the target resource, where a field of the cluster name is optionally a cluster field for specifying a name of an edge cluster where the target resource requires to be deployed. In this manner, the name of the edge cluster included in the field of the cluster name may be directly used as the deployment information. Further, the at least two target edge clusters are determined from the edge clusters establishing the connections with the cloud according to the deployment information. In this manner, the target edge cluster may be quickly and accurately determined.

In S203, resource information associated with the at least two target edge clusters is acquired.

The resource information includes a resource list and resource version information that have been deployed in the at least two target edge clusters.

In S204, the resource list and the resource version information are updated and saved according to the target resource.

Optionally, the target resource is added to the resource list associated with the target edge cluster to update the resource list, that is, the updated resource list is used for representing application resources that should be deployed in the target edge cluster. Since a new target resource is to be deployed in the target edge cluster, the resource version information requires to be generated according to the target resource and an originally deployed resource. In this manner, under different version information, the resources deployed in the target edge cluster are different. It is to be noted that the steps S202 to S204 may be performed before the target resource is added to the preset cache region so that the target resource and the updated resource version information may be integrated and added to the preset cache region together.

In S205, the target resource in the cache region and the updated resource information associated with the at least two target edge clusters are pushed to the at least two target edge clusters for the deployment.

In the embodiment of the present disclosure, the resource information of the target edge cluster being updated may ensure that the cloud accurately records a situation of the resource deployed in the target edge cluster, which provides a guarantee for a subsequent dynamic determination on whether to perform resource synchronization.

Figure 3:
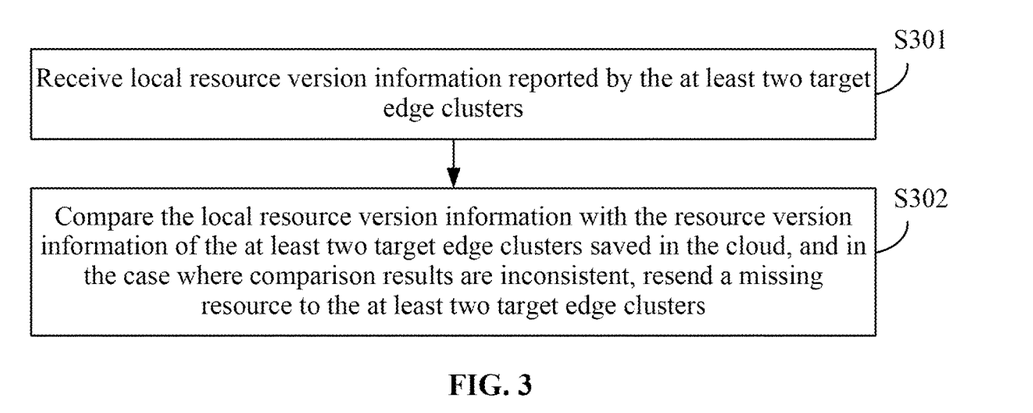
FIG. 3 is a flowchart of another resource synchronization method according to an embodiment of the present disclosure.

FIG. 3 is a flowchart of another resource synchronization method according to an embodiment of the present disclosure. In the embodiment of the present disclosure, since the uncertainty in a network condition of an edge cluster exists, sometimes due to a network problem, a resource synchronization module fails to successfully push a latest target resource to a corresponding target edge cluster, resulting in a failure of resource synchronization. Based on this, a solution for dynamically determining whether to re-push the resource is provided. Specifically, referring to FIG. 3, the resource synchronization method specifically includes the steps described below.

In S301, local resource version information reported by the at least two target edge clusters is received.

In S302, the local resource version information is compared with the resource version information of the at least two target edge clusters saved in the cloud, and in the case where comparison results are inconsistent, a missing resource is resent to the at least two target edge clusters.

In the embodiment of the present disclosure, the resource synchronization module further includes a report sub-module for performing the above steps. The target edge cluster is configured with a proxy service. Local data of the target edge cluster may be acquired regularly through the proxy service, for example, a name of the resource in the target edge cluster, the local resource version information and a status of the resource are acquired, and the acquired information is reported to the report sub-module. Further, the report sub-module compares the local resource version information with latest resource version information of the target edge cluster saved in the cloud. If the comparison results are inconsistent, it indicates that there is a resource that is not successfully synchronized to the target edge cluster due to a network failure. At this time, the missing resource is resent to the target edge cluster. During implementation, a request that the target edge cluster requires to be changed may be inserted into the preset cache region, and a push sub-module in the resource synchronization module re-pushes the resource required by the target edge cluster to the target edge cluster.

In the embodiment of the present disclosure, the local resource version information of the target edge cluster is compared with the resource version information in the cloud, dynamically determining whether to continue to push the resource to the target edge cluster and solving the problem of the failure of the resource synchronization due to the network failure of the edge cluster.

Figure 4:
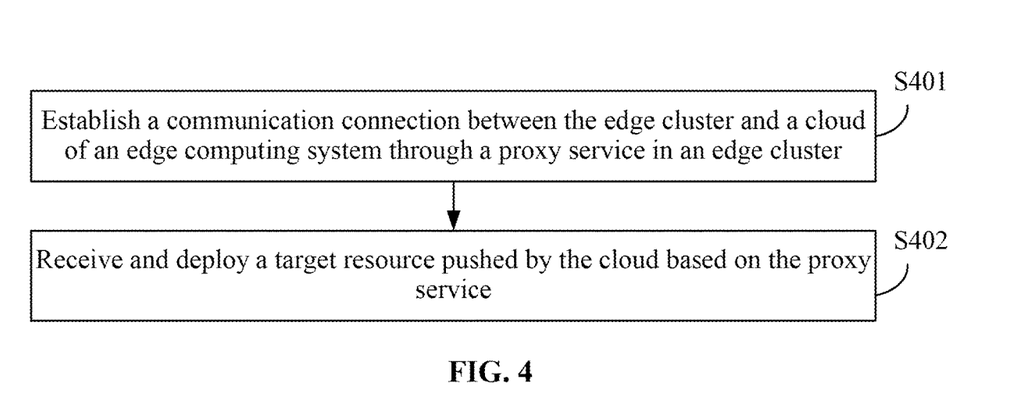
FIG. 4 is a flowchart of another resource synchronization method according to an embodiment of the present disclosure.

FIG. 4 is a flowchart of a resource synchronization method according to an embodiment of the present disclosure. The embodiment may be applicable to the case where a multi-edge device cluster is required to synchronize a resource through a cloud. The method may be performed by a resource synchronization apparatus. The apparatus is implemented by software and/or hardware and integrated in an electronic device, for example, integrated in an edge cluster device. Referring to FIG. 4, the resource synchronization method specifically includes the steps described below.

In S401, a communication connection between the edge cluster and a cloud of an edge computing system is established through a proxy service in an edge cluster.

For a scenario where the edge cluster does not expose an IP of a public network and cannot be connected to the cloud, the proxy service is deployed in each edge cluster in the embodiment of the present disclosure, where the proxy service may be deployed in any edge device in the cluster, or the proxy service may be deployed in a separate device. The proxy service may establish the connection with the cloud according to a fixed IP address of the cloud. For example, the proxy service actively sends a request of WebSocket connection to the cloud. This solves the problem that the edge cluster cannot have the IP of the public network and the cloud cannot actively initiate a request.

In S402, a target resource pushed by the cloud is received and deployed based on the proxy service.

In the embodiment of the present disclosure, the cloud is, in response to listening to a resource change event, configured to add a target resource to a preset cache region. At least two target edge clusters are determined from edge clusters establishing a connection with the cloud according to deployment information carried by the target resource. The target resource in the cache region is pushed to the at least two target edge clusters for deployment. In this manner, a target edge device may receive the target resource sent by the cloud through its own proxy service and perform the target resource.

Further, the proxy service of the edge cluster is also connected to a control node of the edge cluster so that the proxy service may acquire local information of the edge cluster through the control node. For example, local resource version information of the edge cluster is acquired through the proxy service and reported to the cloud so that the cloud compares the local resource version information with resource version information of the edge cluster saved in the cloud. In the case where comparison results are inconsistent, a missing resource is resent to the edge cluster.

In the embodiment of the present disclosure, the proxy service is deployed in each edge cluster and connected to the cloud, which solves the problem that the edge cluster cannot have the IP of the public network and the cloud cannot actively initiate the request. Moreover, the local resource version information is regularly reported through the proxy service, so as to solve the problem of a failure of resource synchronization due to that the edge cluster is disconnected from the network.

Figure 5:
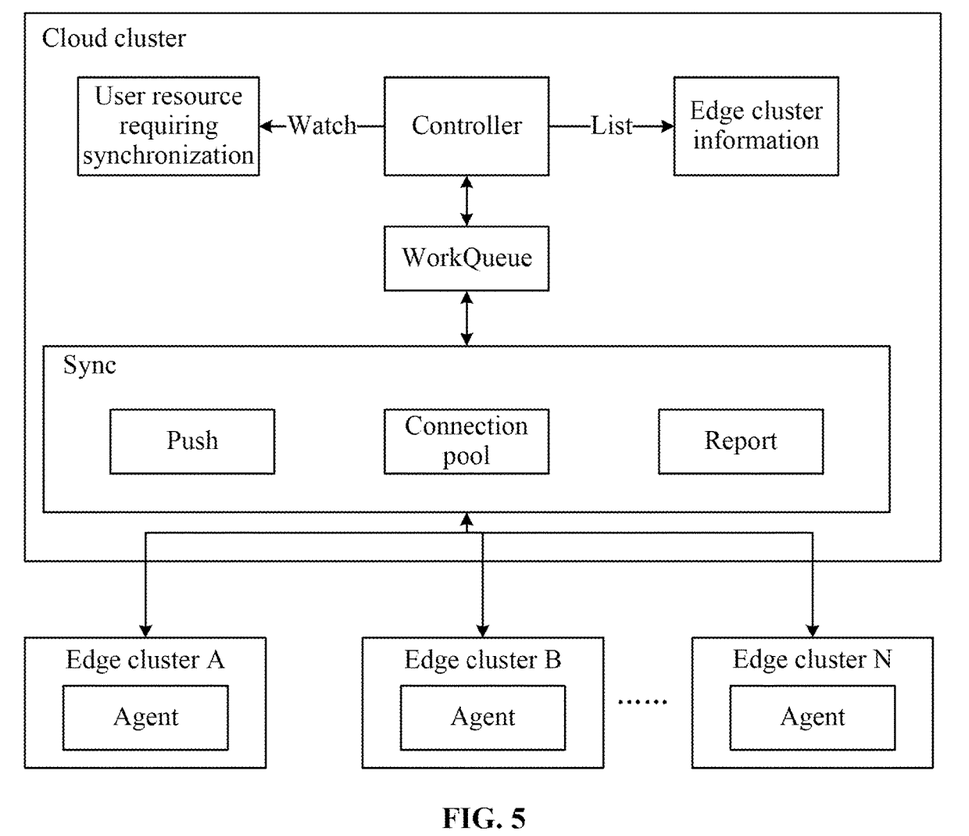
FIG. 5 is a schematic diagram of a composition of a cloud and each edge cluster according to an embodiment of the present disclosure.

FIG. 5 is a schematic diagram of a composition of a cloud and each edge cluster according to an embodiment of the present disclosure. Referring to FIG. 5, the cloud includes a controller "Controller", a preset cache region "WorkQueue" and a resource synchronization module "Sync".

The Controller is responsible for listening to a k8s resource that a user expects to deploy. When listening to a resource change of the user, the Controller triggers a corresponding event change, and acquires corresponding cluster resource information according to the deployed cluster expected by the user. Each cluster generates one piece of new resource version information "resource version". An integrated resource content is pushed to the WorkQueue.

The WorkQueue is used as a buffer layer between the Controller and the Sync for storing a resource content in an edge node that requires to be resynchronized due to the resource change listened by Controller.

The Sync includes a push sub-module "push", a connections pool and a report sub-module "report", where the connection pool maintains a connection with the edge cluster, and the push continuously acquires a resource content that requires to be deployed from WorkQueue and pushes the resource content to different edge clusters. At the same time, the report receives report information of an application state of the edge cluster. When discovering that the reported resource version is inconsistent with a latest version of the cloud, the report actively inserts a request that a node requires to be changed into WorkQueue.

The edge cluster includes a proxy service "Agent", which serves for the edge cluster and actively establishes a connections with the cloud. A resource delivered by the cloud is directly applied to the edge cluster. A state of the application delivered to the edge cluster is collected, and the application state is regularly reported.

In the embodiment of the present disclosure, Controller and the push in Sync enable the same content in multiple edge clusters to be quickly updated when there is a resource change. Moreover, the module report determines whether to re-push the resource by comparing the local version information and the version information of the cloud, ensuring that even if the edge cluster is disconnected from the network for a short time, a latest change request can be received quickly after reconnection.

Figure 6:
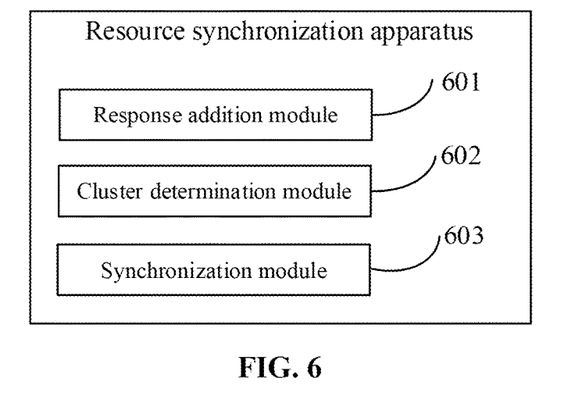
FIG. 6 is a structure diagram of a resource synchronization apparatus according to an embodiment of the present disclosure.

FIG. 6 is a structure diagram of a resource synchronization apparatus according to an embodiment of the present disclosure. The embodiment may be applicable to the case where a multi-edge device cluster is required to synchronize a resource through a cloud. This apparatus is configured in a cloud of an edge computing system. As shown in FIG. 6, this apparatus specifically includes a response addition module 601, a cluster determination module 602 and a synchronization module 603.

The response addition module 601 is, in response to listening to a resource change event, configured to add a target resource to a preset cache region.

The cluster determination module 602 is configured to determine at least two target edge clusters from edge clusters establishing a connections with the cloud according to deployment information carried by the target resource.

The synchronization module 603 is configured to push the target resource in the cache region to the at least two target edge clusters for deployment.

Based on the preceding embodiment, optionally, the cluster determination module includes a deployment information determination unit and a cluster determination unit.

The deployment information determination unit is configured to determine the deployment information according to field information of a cluster name included in the target resource.

The cluster determination unit is configured to determine the at least two target edge clusters from the edge clusters establishing the connections with the cloud according to the deployment information.

Based on the preceding embodiment, optionally, the apparatus further includes a resource information acquisition module and an update module.

The resource information acquisition module is configured to acquire resource information associated with the at least two target edge clusters, where the resource information includes a resource list and resource version information that have been deployed in the at least two target edge clusters.

The update module is configured to update and save the resource list and the resource version information according to the target resource.

Based on the preceding embodiment, optionally, the synchronization module is also configured to perform an operation described below.

The target resource in the cache region and the updated resource information associated with the at least two target edge clusters are pushed to the at least two target edge clusters for the deployment.

Based on the preceding embodiment, optionally, the apparatus further includes an information receiving module and a comparison module.

The information receiving module is configured to receive local resource version information reported by the at least two target edge clusters.

The comparison module is configured to compare the local resource version information with the resource version information of the at least two target edge clusters saved in the cloud, and in the case where comparison results are inconsistent, a missing resource is resent to the at least two target edge clusters.

Based on the preceding embodiment, optionally, the apparatus further includes a resource creation module.

The resource creation module is, in response to receiving a request to deploy a resource, configured to create a target resource corresponding to the request, where the target resource includes deployment information of the resource.

The resource synchronization apparatus provided by the embodiment of the present disclosure may perform the resource synchronization method provided by any embodiment of the present disclosure and has functional modules and beneficial effects corresponding to the performed method. For content not described in detail in this embodiment, reference may be made to description in any method embodiment of the present disclosure.

Figure 7:
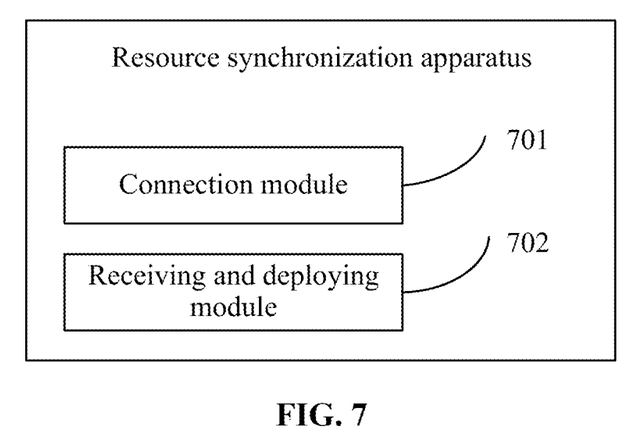
FIG. 7 is a structure diagram of another resource synchronization apparatus according to an embodiment of the present disclosure.

FIG. 7 is a structure diagram of a resource synchronization apparatus according to an embodiment of the present disclosure. The embodiment may be applicable to the case where a multi-edge device cluster is required to synchronize a resource through a cloud. This apparatus is configured in an edge cluster. As shown in FIG. 7, this apparatus specifically includes a connection module 701 and a receiving and deploying module 702.

The connection module 701 is configured to establish a communication connection between the edge cluster and a cloud of an edge computing system through a proxy service in the edge cluster.

The receiving and deploying module 702 is configured to receive and deploy a target resource pushed by the cloud based on the proxy service.

Based on the preceding embodiment, optionally, the apparatus further includes a report module.

The report module is configured to acquire local resource version information of the edge cluster through the proxy service and report the local resource version information to the cloud so that the cloud compares the local resource version information with resource version information of the edge cluster saved in the cloud.

The resource synchronization apparatus provided by the embodiment of the present disclosure may perform the resource synchronization method provided by any embodiment of the present disclosure and has functional modules and beneficial effects corresponding to the performed method. For content not described in detail in this embodiment, reference may be made to description in any method embodiment of the present disclosure.

In the technical solutions of the present disclosure, acquisition, storage and application of user personal information involved are in compliance with relevant laws and regulations and do not violate the public order and good customs.

According to an embodiment of the present disclosure, the present disclosure also provides an electronic device, a readable storage medium and a computer program product.

Figure 8:
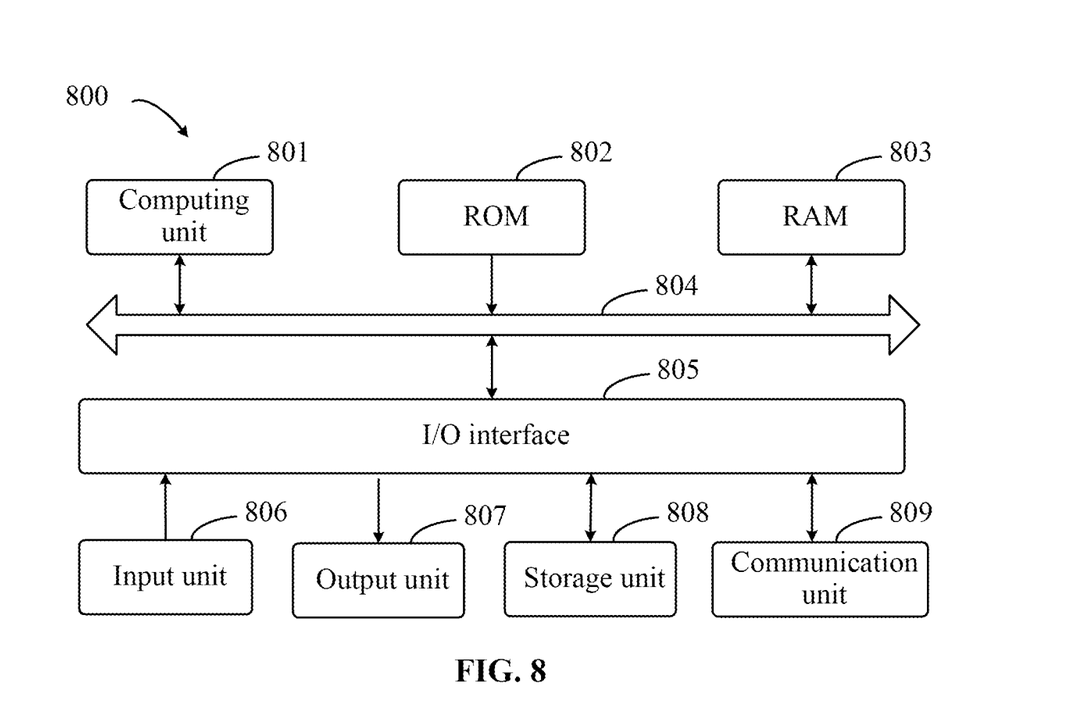
FIG. 8 is a block diagram of an electronic device for implementing a resource synchronization method according to an embodiment of the present disclosure.

FIG. 8 is a block diagram illustrative of an exemplary electronic device 800 that may be configured to implement embodiments of the present disclosure. Electronic devices are intended to represent various forms of digital computers, for example, laptop computers, desktop computers, worktables, personal digital assistants, servers, blade servers, mainframe computers and other applicable computers. Electronic devices may further represent various forms of mobile apparatuses, for example, personal digital assistants, cellphones, smartphones, wearable devices and other similar computing apparatuses. Herein the shown components, the connections and relationships between these components, and the functions of these components are illustrative only and are not intended to limit the implementation of the present disclosure as described and/or claimed herein.

As shown in FIG. 8, the device 800 includes a computing unit 801. The computing unit 801 may perform various types of appropriate operations and processing based on a computer program stored in a read-only memory (ROM) 802 or a computer program loaded from a storage unit 808 to a random-access memory (RAM) 803. Various programs and data required for operations of the device 800 may also be stored in the RAM 803. The computing unit 801, the ROM 802 and the RAM 803 are connected to each other through a bus 804. An input/output (I/O) interface 805 is also connected to the bus 804.

Multiple components in the device 800 are connected to the I/O interface 805. The components include an input unit 806 such as a keyboard and a mouse, an output unit 807 such as various types of displays and speakers, the storage unit 808 such as a magnetic disk and an optical disc, and a communication unit 809 such as a network card, a modem and a wireless communication transceiver. The communication unit 809 allows the device 800 to exchange information/data with other devices over a computer network such as the Internet and/or various telecommunications networks.

The computing unit 801 may be various general-purpose and/or special-purpose processing components having processing and computing capabilities. Examples of the computing unit 801 include, but are not limited to, a central processing unit (CPU), a graphics processing unit (GPU), a special-purpose artificial intelligence (AI) computing chip, a computing unit executing machine learning models and algorithms, a digital signal processor (DSP), and any appropriate processor, controller and microcontroller. The computing unit 801 performs various methods and processing described above, such as the resource synchronization method. For example, in some embodiments, the resource synchronization method may be implemented as a computer software program tangibly contained in a machine-readable medium such as the storage unit 808. In some embodiments, part or all of computer programs may be loaded and/or installed on the device 800 via the ROM 802 and/or the communication unit 809. When the computer program is loaded to the RAM 803 and executed by the computing unit 801, one or more steps of the preceding resource synchronization method may be performed. Alternatively, in other embodiments, the computing unit 801 may be configured, in any other suitable manner (for example, by means of firmware), to perform the resource synchronization method.

Herein various embodiments of the preceding systems and techniques may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The at least one programmable processor may be a special-purpose or general-purpose programmable processor for receiving data and instructions from a memory system, at least one input apparatus, and at least one output apparatus and transmitting data and instructions to the memory system, the at least one input apparatus, and the at least one output apparatus.

Program codes for implementation of the methods of the present disclosure may be written in one programming language or any combination of multiple programming languages. These program codes may be provided for the processor or controller of a general-purpose computer, a special-purpose computer, or another programmable data processing apparatus to cause functions/operations specified in flowcharts and/or block diagrams to be implemented when the program codes are executed by the processor or controller. The program codes may be executed entirely on a machine, partly on a machine, as a stand-alone software package, partly on a machine and partly on a remote machine, or entirely on a remote machine or a server.

In the context of the present disclosure, the machine-readable medium may be a tangible medium that may include or store a program that is used by or in conjunction with a system, apparatus or device that executes instructions. The machine-readable medium may be a machine-readable signal medium or a machine-readable storage medium. The machine-readable medium may include, but is not limited to, an electronic, magnetic, optical, electromagnetic, infrared, or semiconductor system, apparatus or device or any appropriate combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device or any appropriate combination thereof.

In order that interaction with a user is provided, the systems and techniques described herein may be implemented on a computer. The computer has a display device (for example, a cathode-ray tube (CRT) or a liquid-crystal display (LCD) monitor) for displaying information to the user and a keyboard and a pointing device (for example, a mouse or a trackball) through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN) and the Internet.

The computing system may include clients and servers. The clients and the servers are usually far away from each other and generally interact through the communication network. The relationship between the client and the server arises by virtue of computer programs running on respective computers and having a client-server relationship to each other. The server may be a cloud server, a server of a distributed system or a server combined with a blockchain.

It is to be understood that various forms of the preceding flows may be used, with steps reordered, added, or removed. For example, the steps described in the present disclosure may be executed in parallel, in sequence, or in a different order as long as the desired results of the technical solutions disclosed in the present disclosure is achieved. The execution sequence of these steps is not limited herein.

The scope of the present disclosure is not limited to the preceding embodiments. It is to be understood by those skilled in the art that various modifications, combinations, sub-combinations, and substitutions may be made depending on design requirements and other factors. Any modifications, equivalent substitutions, improvements, and the like made within the spirit and principle of the present disclosure are within the scope of the present disclosure.

What is claimed is:

1. A resource synchronization method, applied to a cloud of an edge computing system, comprising:
   in response to listening to a resource change event, adding a target resource to a preset cache region;
   determining at least two target edge clusters where the target resource requires to be deployed from edge clusters establishing connections with the cloud according to deployment information carried by the target resource; and
   pushing the target resource in the cache region to the at least two target edge clusters for deployment;
   wherein the determining the at least two target edge clusters where the target resource requires to be deployed from the edge clusters establishing the connections with the cloud according to the deployment information carried by the target resource comprises:
       determining the deployment information according to field information of a cluster name comprised in the target resource, wherein the field information of the cluster name is used for specifying names of the at least two target edge clusters where the target resource requires to be deployed, and the deployment information comprises the names of the at least two target edge clusters where the target resource requires to be deployed; and
       determining the at least two target edge clusters where the target resource requires to be deployed from the edge clusters establishing the connections with the cloud according to the deployment information.

2. The method according to claim 1, further comprising:
   acquiring resource information associated with the at least two target edge clusters, wherein the resource information comprises a resource list and resource version information that have been deployed in the at least two target edge clusters; and
   updating and saving the resource list and the resource version information according to the target resource.

3. The method according to claim 2, wherein the pushing the target resource in the cache region to the at least two target edge clusters for the deployment comprises:
   pushing the target resource in the cache region and the updated resource information associated with the at least two target edge clusters to the at least two target edge clusters for the deployment.

4. The method according to claim 3, further comprising:
   receiving local resource version information reported by the at least two target edge clusters; and
   comparing the local resource version information with the resource version information of the at least two target edge clusters saved in the cloud, and in a case where comparison results are inconsistent, resending a missing resource to the at least two target edge clusters.

5. The method of claim 1, further comprising:
   in response to receiving a request to deploy a resource, creating a target resource corresponding to the request, wherein the target resource comprises deployment information of the resource.

6. A non-transitory computer-readable storage medium storing computer instructions for causing a computer to perform the method according claim 1.

7. The non-transitory computer-readable storage medium according to claim 6, further comprising:
   acquiring resource information associated with the at least two target edge clusters, wherein the resource information comprises a resource list and resource version information that have been deployed in the at least two target edge clusters; and
   updating and saving the resource list and the resource version information according to the target resource.

8. The non-transitory computer-readable storage medium according to claim 7, wherein the pushing the target resource in the cache region to the at least two target edge clusters for the deployment comprises:
   pushing the target resource in the cache region and the updated resource information associated with the at least two target edge clusters to the at least two target edge clusters for the deployment.

9. The non-transitory computer-readable storage medium according to claim 8, further comprising:
   receiving local resource version information reported by the at least two target edge clusters; and
   comparing the local resource version information with the resource version information of the at least two target edge clusters saved in the cloud, and in a case where comparison results are inconsistent, resending a missing resource to the at least two target edge clusters.

10. The non-transitory computer-readable storage medium of claim 9, further comprising:
    in response to receiving a request to deploy a resource, creating a target resource corresponding to the request, wherein the target resource comprises deployment information of the resource.

11. An electronic device, comprising:
    at least one processor; and a memory communicatively connected to the at least one processor, wherein the memory stores instructions executable by the at least one processor to enable the at least one processor to perform a resource synchronization method, wherein the resource synchronization method comprises:

in response to listening to a resource change event, adding a target resource to a preset cache region;

determining at least two target edge clusters where the target resource requires to be deployed from edge clusters establishing connections with the cloud according to deployment information carried by the target resource; and pushing the target resource in the cache region to the at least two target edge clusters for deployment;

wherein the determining the at least two target edge clusters where the target resource requires to be deployed from the edge clusters establishing the connections with the cloud according to the deployment information carried by the target resource comprises:

determining the deployment information according to field information of a cluster name comprised in the target resource, wherein the field information of the cluster name is used for specifying names of the at least two target edge clusters where the target resource requires to be deployed, and the deployment information comprises the names of the at least two target edge clusters where the target resource requires to be deployed; and determining the at least two target edge clusters where the target resource requires to be deployed from the edge clusters establishing the connections with the cloud according to the deployment information.

12. The electronic device according to claim 11, further comprising:

acquiring resource information associated with the at least two target edge clusters, wherein the resource information comprises a resource list and resource version information that have been deployed in the at least two target edge clusters; and updating and saving the resource list and the resource version information according to the target resource.

13. The electronic device according to claim 12, wherein the pushing the target resource in the cache region to the at least two target edge clusters for the deployment comprises:

pushing the target resource in the cache region and the updated resource information associated with the at least two target edge clusters to the at least two target edge clusters for the deployment.

14. The electronic device according to claim 13, further comprising:

receiving local resource version information reported by the at least two target edge clusters; and comparing the local resource version information with the resource version information of the at least two target edge clusters saved in the cloud, and in a case where comparison results are inconsistent, resending a missing resource to the at least two target edge clusters.

15. The electronic device of claim 11, further comprising:

in response to receiving a request to deploy a resource, creating a target resource corresponding to the request, wherein the target resource comprises deployment information of the resource.

* * * * *

UNITED STATES PATENT AND TRADEMARK OFFICE
CERTIFICATE OF CORRECTION

| | | |
|---|---|---|
| PATENT NO. | : 12,032,998 B2 | Page 1 of 1 |
| APPLICATION NO. | : 18/157523 | |
| DATED | : July 9, 2024 | |
| INVENTOR(S) | : Pengfei Han | |

It is certified that error appears in the above-identified patent and that said Letters Patent is hereby corrected as shown below:

On the Title Page

Item (54) and in the Specification Column 1, Lines 1-3 Please correct the Title to read:
RESOURCE SYNCHRONIZATION METHOD, ELECTRONIC DEVICE AND STORAGE MEDIUM Signed and Sealed this
Thirteenth Day of August, 2024

Katherine Kelly Vidal
*Director of the United States Patent and Trademark Office*